United States Patent
Briere et al.

(10) Patent No.: US 7,902,809 B2
(45) Date of Patent: Mar. 8, 2011

(54) DC/DC CONVERTER INCLUDING A DEPLETION MODE POWER SWITCH

(75) Inventors: Michael A. Briere, Manhattan Beach, CA (US); Jason Zhang, Monterey Park, CA (US); Bo Yang, San Diego, CA (US)

(73) Assignee: International Rectifier Corporation, El Segundo, CA (US)

( * ) Notice: Subject to any disclaimer, the term of this patent is extended or adjusted under 35 U.S.C. 154(b) by 463 days.

(21) Appl. No.: 11/986,848

(22) Filed: Nov. 27, 2007

(65) Prior Publication Data

US 2008/0122418 A1    May 29, 2008

Related U.S. Application Data

(60) Provisional application No. 60/867,437, filed on Nov. 28, 2006.

(51) Int. Cl.
*H02M 3/155* (2006.01)
(52) U.S. Cl. .......................... 323/351; 323/271
(58) Field of Classification Search .................. 323/271, 323/282, 351
See application file for complete search history.

(56) References Cited

U.S. PATENT DOCUMENTS

| | | | |
|---|---|---|---|
| 6,011,416 A | | 1/2000 | Mizuno et al. |
| 6,150,798 A | | 11/2000 | Ferry et al. |
| 6,597,210 B2 | | 7/2003 | Carsten |
| 6,693,412 B2 | * | 2/2004 | Ruan et al. ................ 323/282 |
| 6,707,281 B2 | * | 3/2004 | Solivan ...................... 323/225 |
| 6,861,828 B2 | | 3/2005 | Watanabe |
| 7,006,362 B2 | * | 2/2006 | Mizoguchi et al. .......... 363/16 |
| 2002/0171405 A1 | * | 11/2002 | Watanabe .................. 323/282 |
| 2006/0233000 A1 | * | 10/2006 | Akagi ........................ 363/37 |
| 2007/0008747 A1 | * | 1/2007 | Soldano et al. ........... 363/21.04 |
| 2008/0122418 A1 | * | 5/2008 | Briere et al. ............... 323/282 |
| 2009/0180304 A1 | * | 7/2009 | Bahramian et al. ........ 363/124 |
| 2009/0278513 A1 | * | 11/2009 | Bahramian et al. ........ 323/217 |

* cited by examiner

*Primary Examiner* — Jeffrey L Sterrett
(74) *Attorney, Agent, or Firm* — Farjami & Farjami LLP

(57) ABSTRACT

A buck converter circuit is disclosed in which one or both of the control switch and the synchronous switch are III-nitride-based depletion mode. An enhancement mode switch is connected with one or both of the III-nitride based switches and operated to prevent conduction of current by the III-nitride based switch until all biases are established for proper operation.

20 Claims, 7 Drawing Sheets

DC/DC CONVERTER INCLUDING A DEPLETION MODE POWER SWITCH

RELATED APPLICATION

This application claims the benefit of U.S. Provisional Application No. 60/867,437, filed Nov. 28, 2006, the entire disclosure of which is incorporated by reference herein.

FIELD OF THE INVENTION

This invention relates to DC/DC conversion circuits and more specifically relates to a buck converter circuit using one or more depletion mode III-nitride based switches.

BACKGROUND AND SUMMARY OF THE INVENTION

The synchronous buck converter circuit is commonly used for DC/DC switching applications. Traditionally, the silicon based MOSFET is used in these circuits. III-nitride based heterojunction switches are also well known and have greater current capacity and improved voltage withstand ability than a silicon based device of the same size and have reduced parasitic capacitances. However, many III-nitride based switches suitable for power applications are normally on in the absence of a gate signal.

A circuit according to the present invention is a converter that includes a first switch, a III-nitride depletion mode switch, and an enhancement mode switch disposed in the path of conduction to the III-nitride depletion mode switch to selectively open/close the conduction path to the III-nitride depletion mode switch.

According to one aspect of the present invention, the enhancement mode switch enables the conduction of current to the III-nitride switch.

According to another aspect of the present invention, the enhancement mode switch cuts off the current to the III-nitride switch.

DETAILED DESCRIPTION OF THE INVENTION

Figure 1:
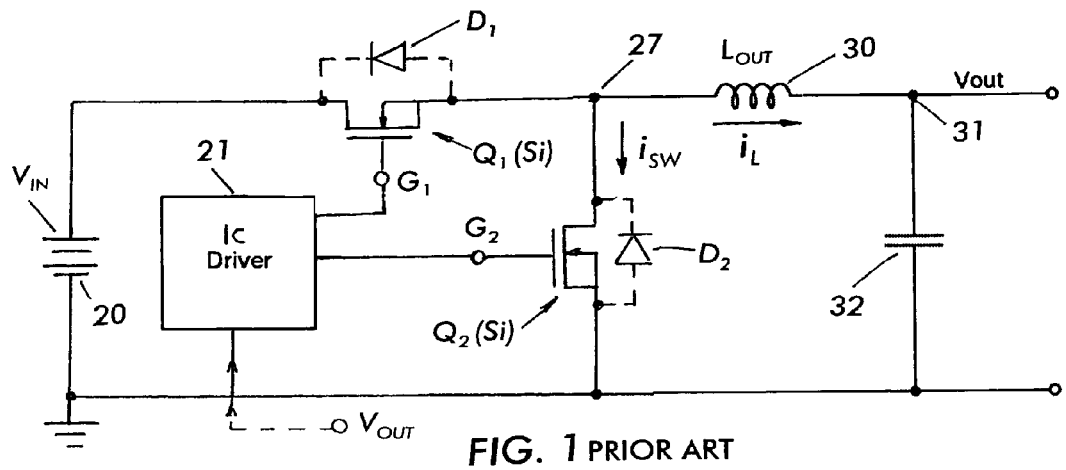
FIG. 1 illustrates a buck converter circuit according to the prior art.

FIG. 1 shows a conventional buck converter circuit comprising an input d-c source 20 of voltage $V_{in}$ connected in series with a control MOSFET $Q_1$ (Silicon-based), an output inductor $L_{out}$ 30 and to an output node $V_{out}$ 31. A synchronous MOSFET $Q_2$ (silicon based) is connected from switched node 27 between $Q_1$ and $L_{out}$ to ground (the battery 20 return). An output capacitor $C_{out}$ 32 is provided as usual. Devices $Q_1$ and $Q_2$ may have parasitic internal diodes $D_1$ and $D_2$.

Figure 2:
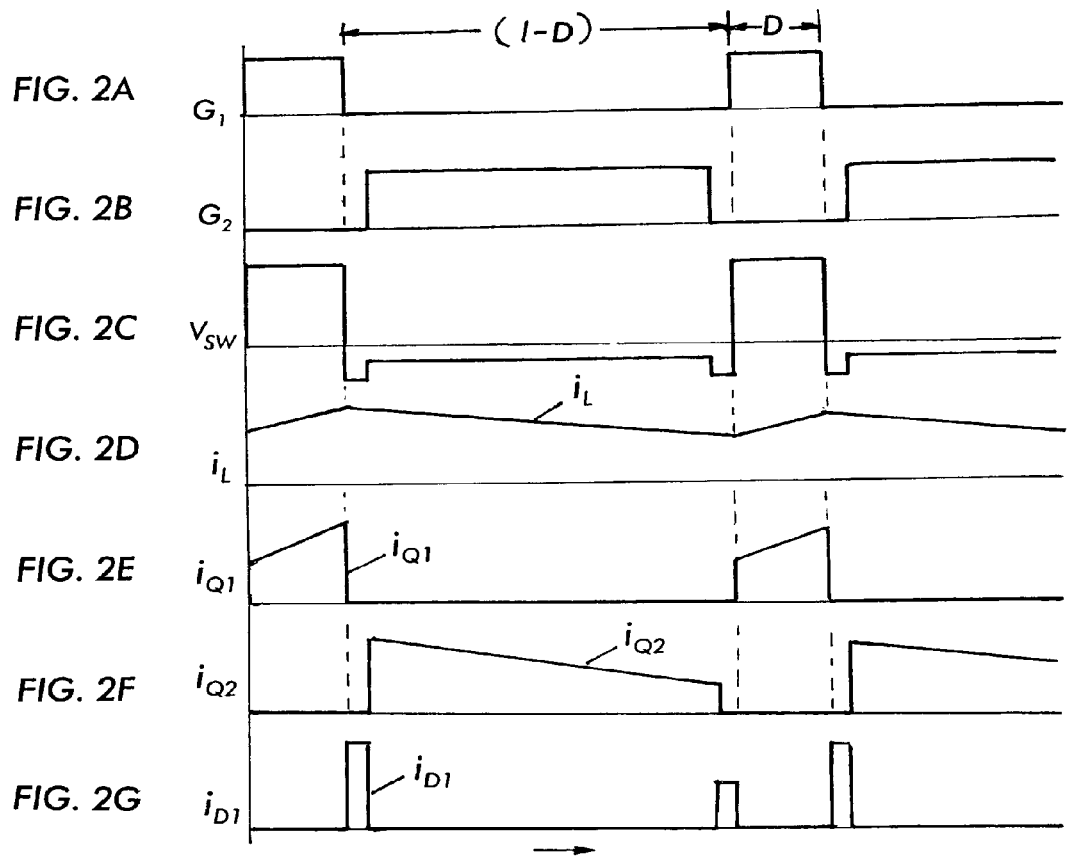
FIGS. 2A-2G illustrates the waveform diagram for the converter of FIG. 1.

A control IC (driver 21) is connected to the gates $G_1$ and $G_2$ of FETs $Q_1$ and $Q_2$ and drives the devices as shown in FIGS. 2A and 2B. A bias voltage $V_{DR}$ is connected through capacitor 22 (not shown) to power the IC 21. The waveforms of the various currents in the circuit are shown in FIGS. 2C to 2G. The output of Vout is measured and the timing of the voltages at $G_1$ and $G_2$ is appropriately modified to vary the duty cycle D (FIG. 2A) to maintain a predetermined fixed output voltage $V_{out}$, regardless of changes in the voltage $V_{in}$.

The synchronous buck converter of FIG. 1 is widely used as a non-isolated power conversion circuit, based on its half bridge topology. It is desirable to reduce the reactive components to a minimum for higher switching frequencies, making the dynamic behavior of the switches $Q_1$ and $Q_2$ a key factor. Thus, the silicon based MOSFETs $Q_1$ and $Q_2$ of FIG. 1 require a minimization of their parasitic capacitances, specifically the gate to drain (Miller) capacitance; and the source to drain (output) capacitance to increase the efficiency of the circuit.

Gallium Nitride (GaN) switches are known (for example III-Nitride heterojunction HEMT devices) which have certain improved switching characteristics, as compared to silicon based MOSFETs and particularly have a lower parasitic Miller and output capacitance.

It may be desirable to use a normally-on (depletion mode) III-nitride heterojunction power semiconductor device in a power converter application, such as a DC-DC converter. One such application may be a buck converter that includes at least one III-nitride depletion mode heterojunction power semiconductor device.

Figure 3A:
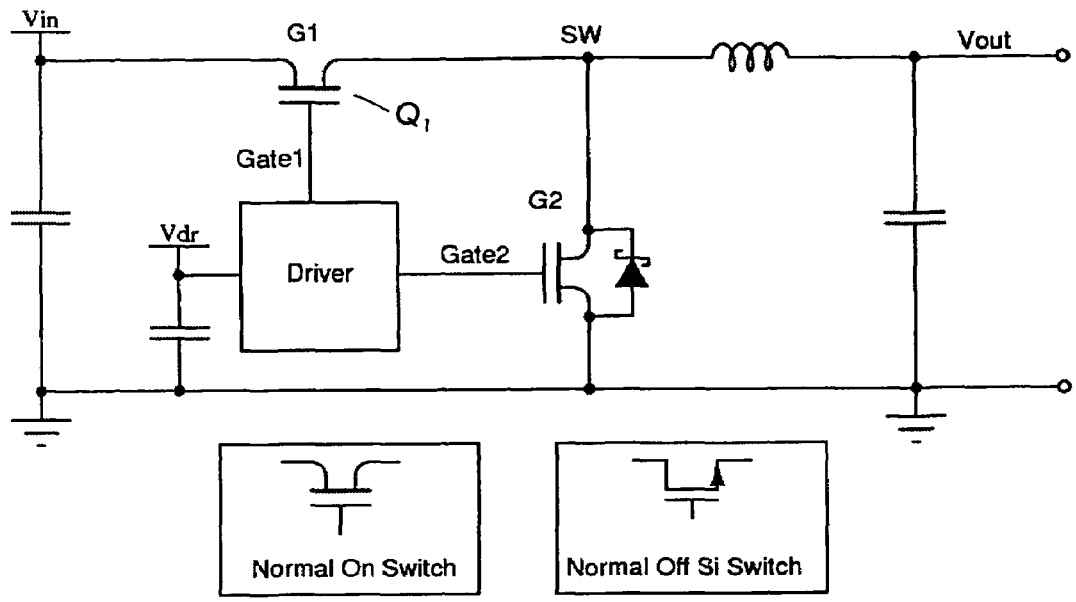
FIGS. 3A-3C illustrate buck converters that include at least one III-nitride depletion mode device.
Figure 3B:
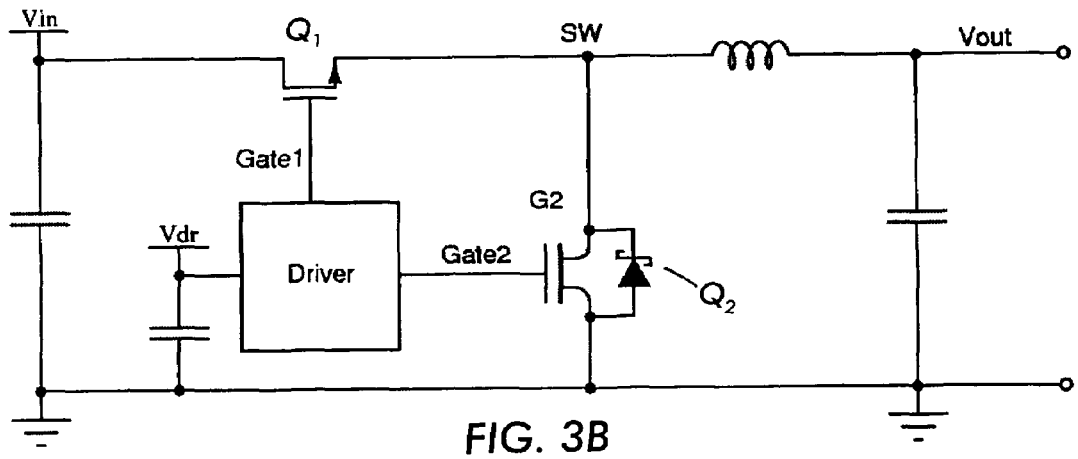
Figure 3C:
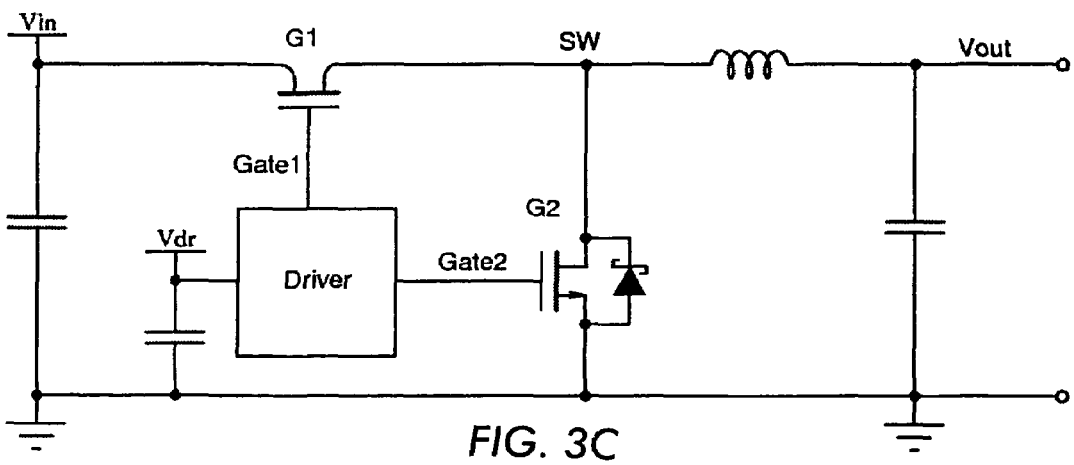

Thus, for example, the control switch $Q_1$ and synchronous switch $Q_2$ may be depletion mode devices (FIG. 3A), only the synchronous switch $Q_2$ can be a depletion mode device (FIG. 3B), or only the control switch $Q_1$ can be a depletion mode device (FIG. 3C).

In power converters that use at least one normally-on (depletion mode) device, there is a possibility of damage to the circuit if $V_{in}$ powers up earlier than $V_{dr}$ to the IC driver 21 or $V_{out}$ is pre-biased thereby causing a short circuit between $V_{in}$ to $V_{out}$ or $V_{out}$ to ground.

A circuit according to the present invention overcomes the above-mentioned problems by providing an enable switch which solves the power up sequence problem of $V_{in}$ and $V_{dr}$, or a cutoff-switch to handle the pre-bias problem. These two solutions can be combined as in FIG. 16.

Figure 4:
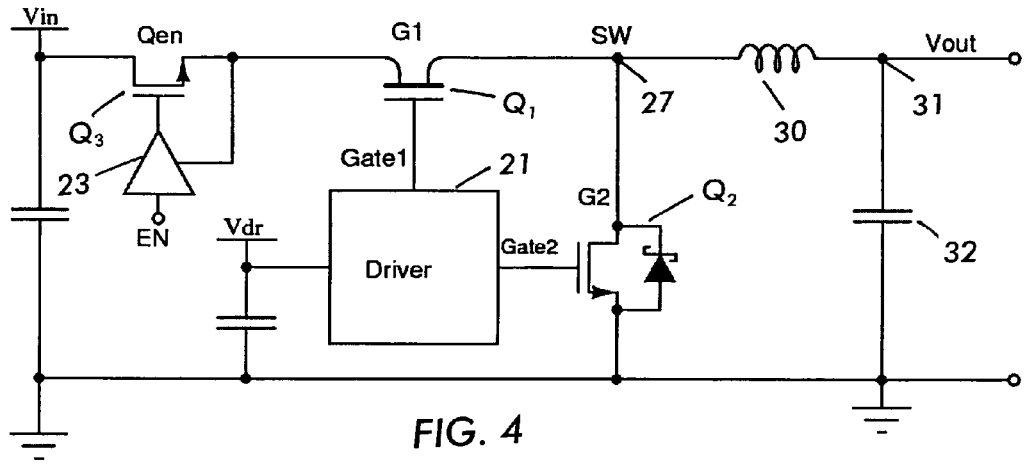
FIGS. 4-6 illustrate embodiments that include an enhancement mode enable switch to enable the conduction of current through the III-nitride switch in the high side.

Referring now to FIG. 4, in which like numerals identify like features, in a circuit according to the first embodiment of the present invention, a silicon based enable switch $Q_3$ is series connected with a III-nitride depletion mode control switch $Q_1$, which is in a buck arrangement with an enhancement mode silicon synchronous switch $Q_2$ (e.g. a silicon based MOSFET). Enable switch $Q_3$ is a normally-off switch, which in the preferred embodiment may be a silicon-based power MOSFET, driven by an enable signal EN from a driver 23.

Figure 5:
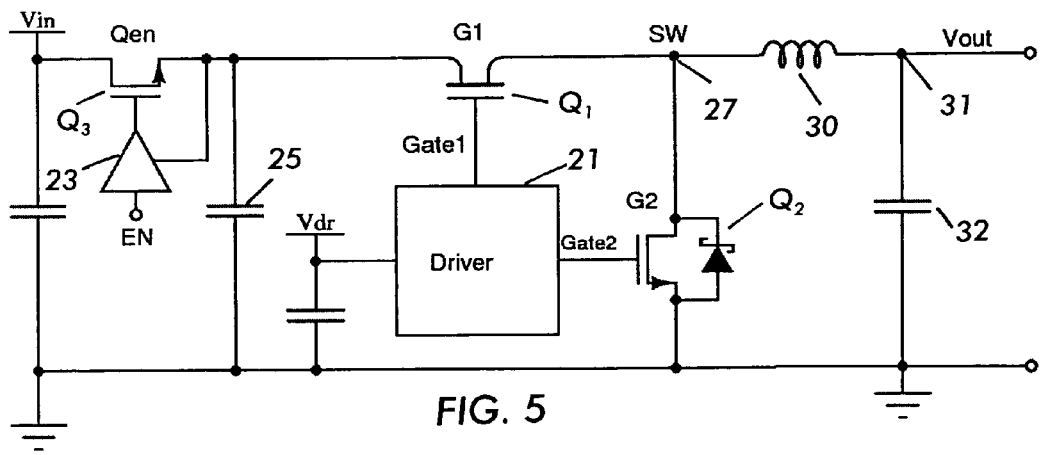

Referring to FIG. 5, in a second embodiment, a capacitor 25 is parallel connected between Vin and ground to reduce the parasitic elements induced by the insertion of the enable switch Q3. Otherwise, the arrangement is similar to the one shown in FIG. 4.

Figure 6:
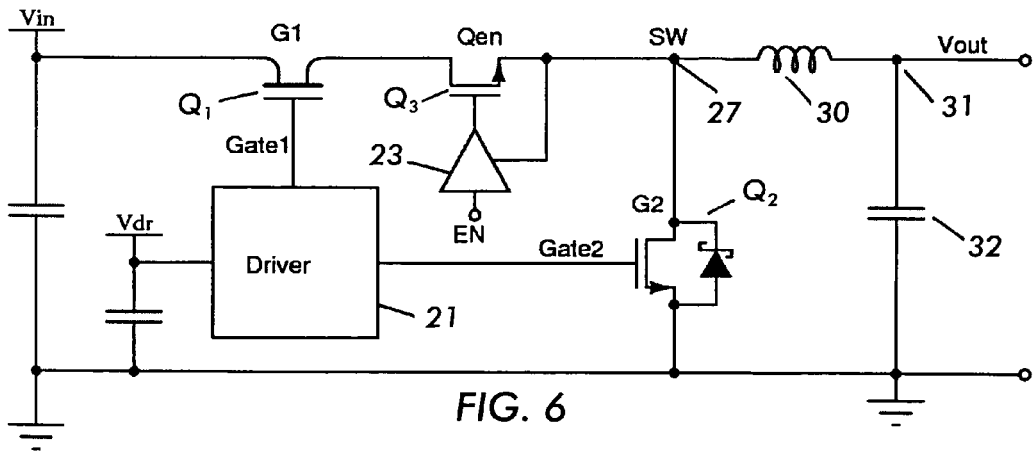

Referring now to FIG. 6, in a third embodiment according to the present invention, the enable switch $Q_3$ is series connected between III-nitride control switch $Q_1$ and switched node 27. Otherwise, the circuit shown in FIG. 6 is similar to the first embodiment as illustrated by FIG. 4.

Figure 7:
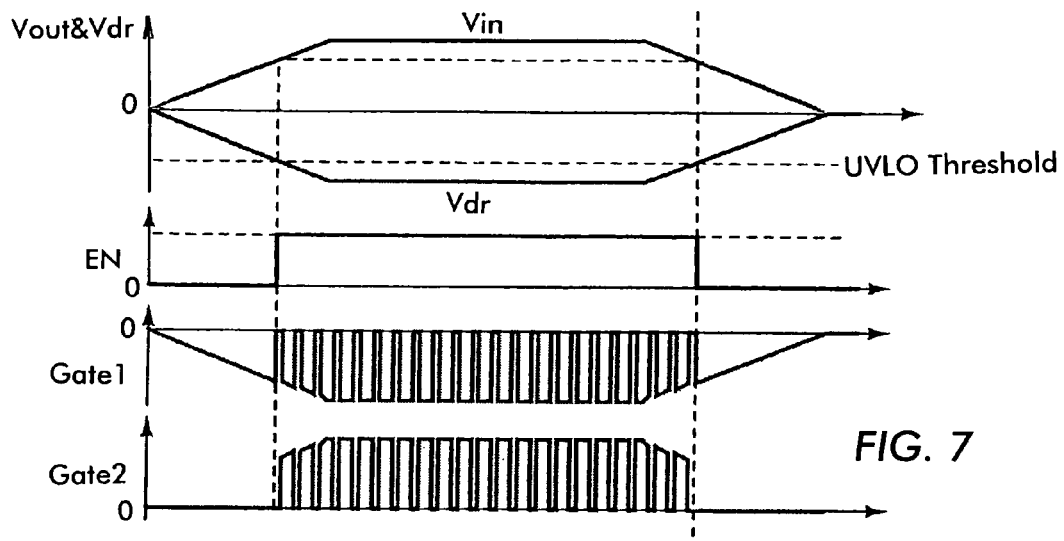
FIG. 7 illustrates the waveform diagram for the embodiments of FIGS. 4-6.

FIG. 7 illustrates a waveform diagram for the circuits that include an enable switch $Q_3$. Thus, when Vin is established before the driver IC bias voltage Vdr, which is negative, the gate of the III-nitride switch will not be negatively biased to turn off. As a result, the III-nitride device is still on to let input voltage pass through $Q_1$ to the output. To solve the problem, the enable switch is off until the negative Vdr is established beyond the threshold voltage of the III-nitride switch (UVLO: under voltage lockout). Enable switch on/off is controlled by EN signal. The same sequence happens during power off. When Vdr drops below UVLO threshold, enable switch turns off to block the conduction by the III-nitride switch. The pulse signals of $Q_1$ and $Q_2$ represent PWM switching during the normal operation.

Figure 8:
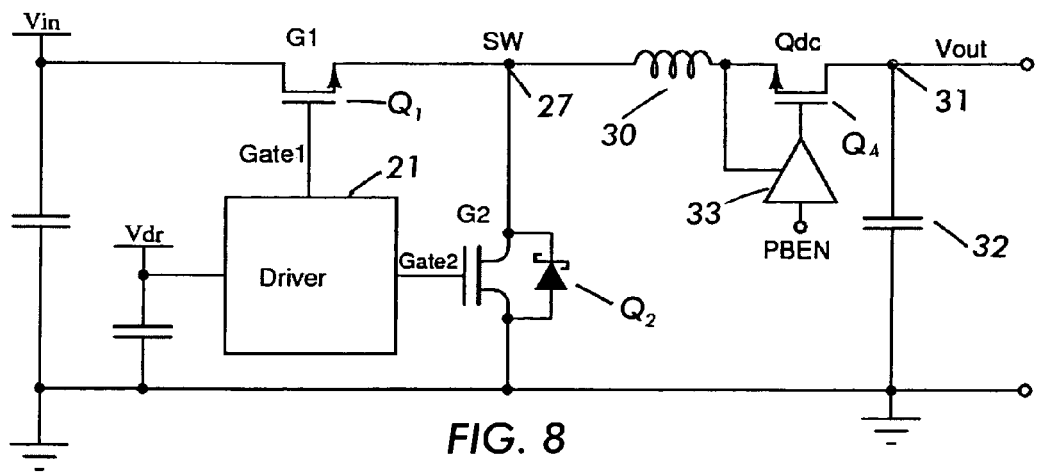
FIGS. 8-14 illustrate embodiments that include an enhancement mode cut off switch to cut off the conduction of current through the III-nitride switch in the low side.

Referring now to FIG. 8, in a circuit according to the fourth embodiment of the present invention, synchronous switch $Q_2$ is a depletion mode III-nitride switch, while the control switch $Q_1$ is a silicon based device, for example, a silicon-based power MOSFET. To prevent damage due to the pre-biased condition (i.e. the presence of partial $V_{out}$ during power up which may be discharged by the power switch $Q_2$), a cutoff-switch $Q_4$ is series connected between inductor 30 and output node 31. Cutoff-switch $Q_4$ is preferably a silicon-based switch, for example, a silicon-based power MOSFET which is operated by a drive signal PBEN from driver 33.

Figure 9:
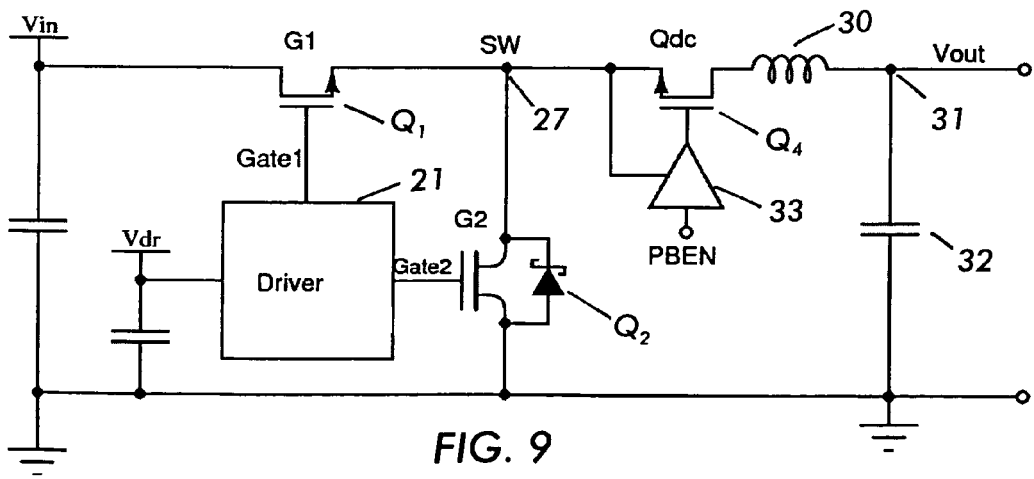

Referring now to FIG. 9, in a circuit according to the fifth embodiment, cutoff-switch $Q_4$ is series connected between the switched node 27 and inductor 30. Otherwise, the circuit is similar to the fourth embodiment as illustrated by FIG. 8.

Figure 10:
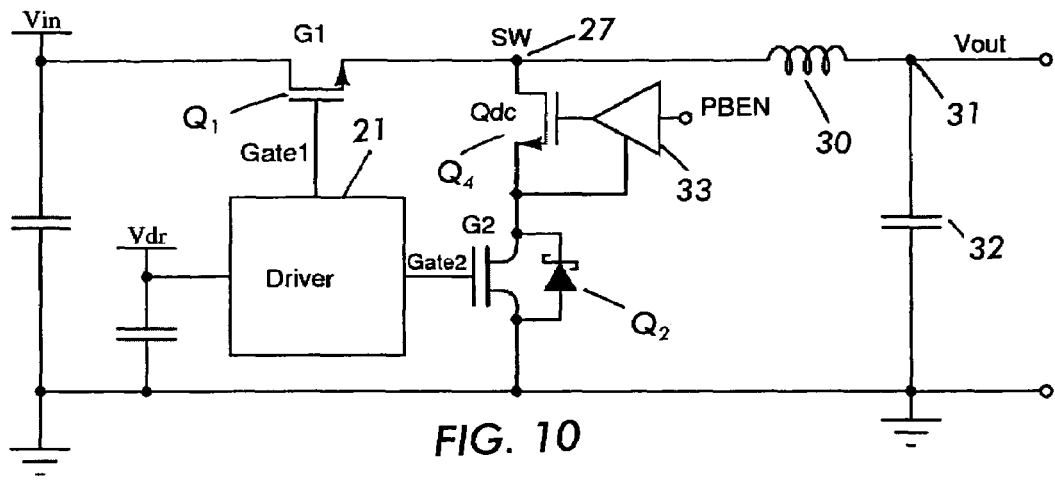

Referring to FIG. 10, in a circuit according to the sixth embodiment, cutoff-switch $Q_4$ is series connected between synchronous switch $Q_2$ and switched node 27. Otherwise, the circuit is similar to the fourth embodiment.

Figure 11:
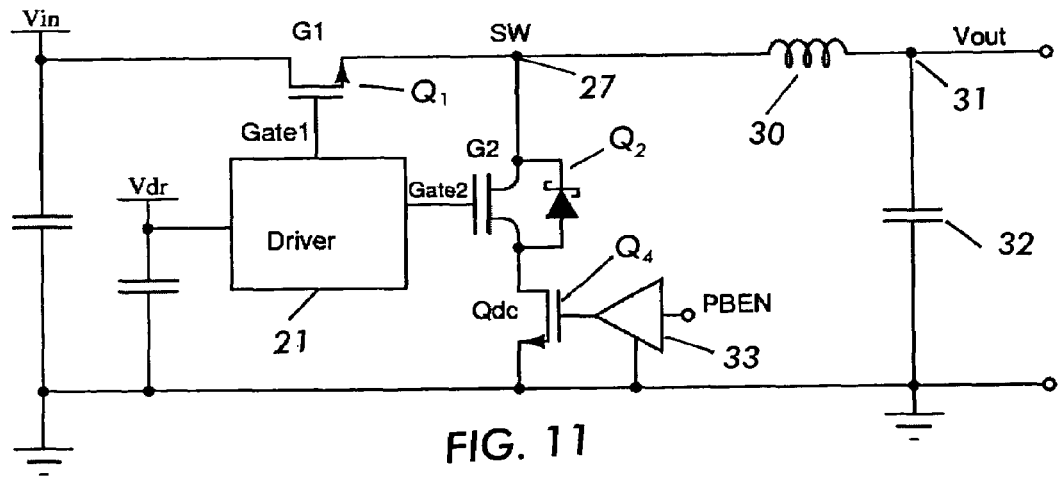

Referring to FIG. 11, in a circuit according to the seventh embodiment, cutoff-switch $Q_4$ is series connected between the synchronous switch $Q_2$ and ground. Otherwise, the seventh embodiment is similar to the fourth embodiment of the present invention.

Figure 12:
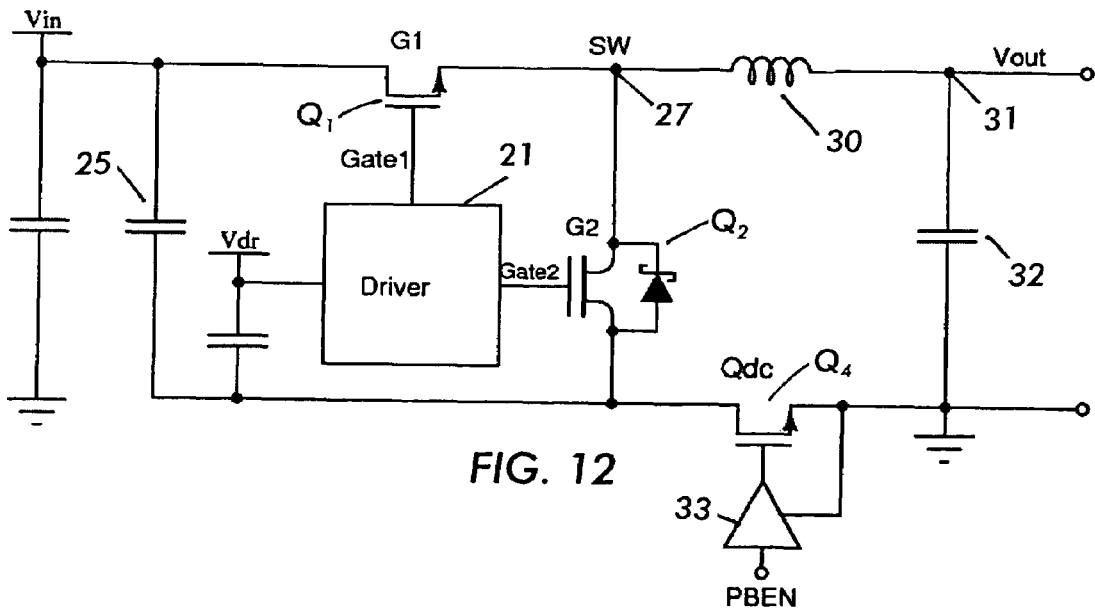

Referring now to FIG. 12, in a circuit according to the eighth embodiment, cutoff-switch $Q_4$ is connected between the ground connection of synchronous switch $Q_2$ and the ground connection of output capacitor 32. The eighth embodiment may further include a capacitor 25 parallel connected between $V_{in}$ and $Q_2$ return. Capacitor 32 provides low impedance bypass for the floating power stage consisting of driver and $Q_1/Q_2$ because once $Q_4$ is off which cuts off the ground, capacitor 32 return is not the same as ground any more. Otherwise, the eighth embodiment is similar to the fourth embodiment.

Figure 13:
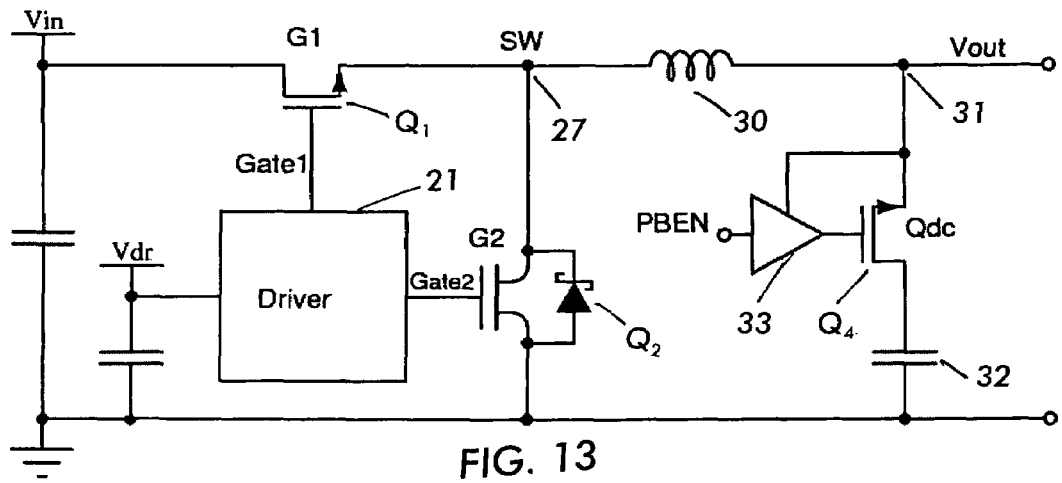

Referring to FIG. 13, in a circuit according to the ninth embodiment, cutoff-switch $Q_4$ is series connected between output capacitor 32 and $V_{out}$ node 31. Otherwise, the ninth embodiment is similar to the fourth embodiment.

Figure 14A:
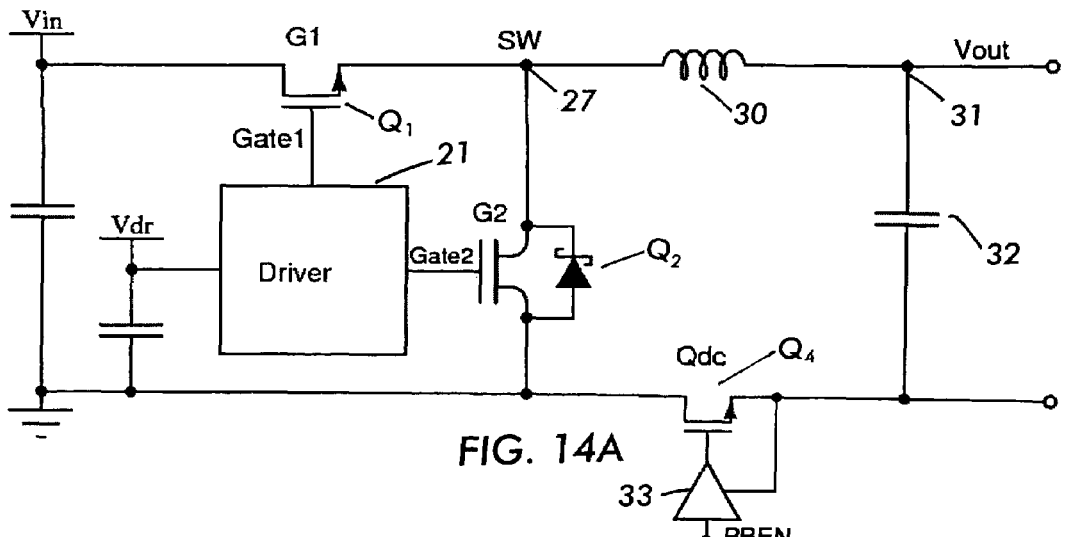
Figure 14B:
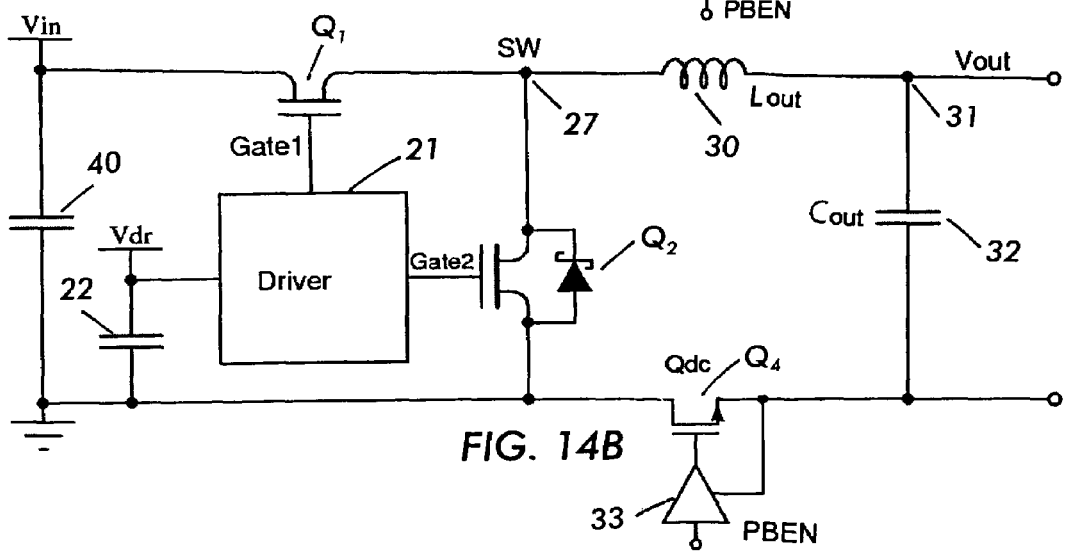

Referring now to FIG. 14, in a circuit according to the tenth embodiment, capacitor 25 may be omitted from the eighth embodiment. Note that in this embodiment $V_{out}$ return is not ground any more due to the presence of cutoff switch $Q_4$. Comparing to FIG. 12, which floats driver and $Q_1/Q_2$, this embodiment floats $V_{out}$. Thus, the difference is whether the $V_{in}$ capacitor return is connected to $Q_2$ or $V_{out}$.

Figure 15:
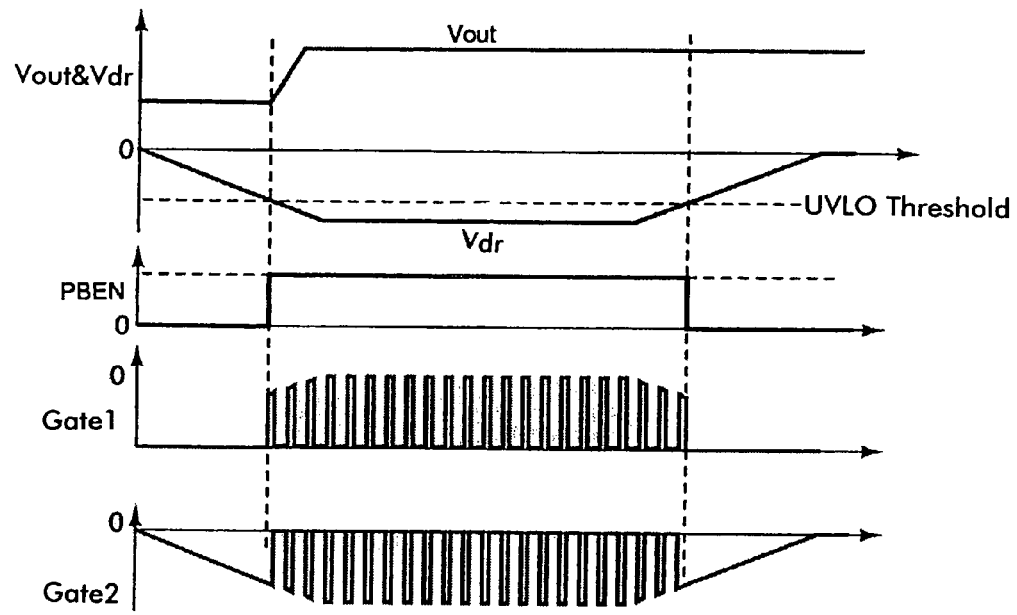
FIG. 15 illustrate a waveform diagram for the embodiments of FIGS. 8-14B.

FIG. 15 illustrates a waveform diagram for a circuit that includes a pre-biased cutoff-switch $Q_3$ according to the present invention. Thus, when partial $V_{out}$ is established before the driver IC bias voltage Vdr, which is negative, the gate of $Q_2$ will not be negatively biased to turn off. As a result, $Q_2$ is still on to discharge $V_{out}$, which is not allowed in many applications. To solve the problem, the cutoff switch is inserted between Q2 and $V_{out}$ capacitor. Enable switch is off until the negative Vdr is established beyond the threshold voltage of the III-nitride switch (UVLO: under voltage lockout). Cutoff switch on/off is controlled by PEN signal. The same sequence happens during power off. When Vdr drops below UVLO threshold, cutoff switch turns off to block conduction by the III-nitride switch. The pulse signals of $Q_1$ and $Q_2$ represent PWM switching during normal operation.

Figure 16:
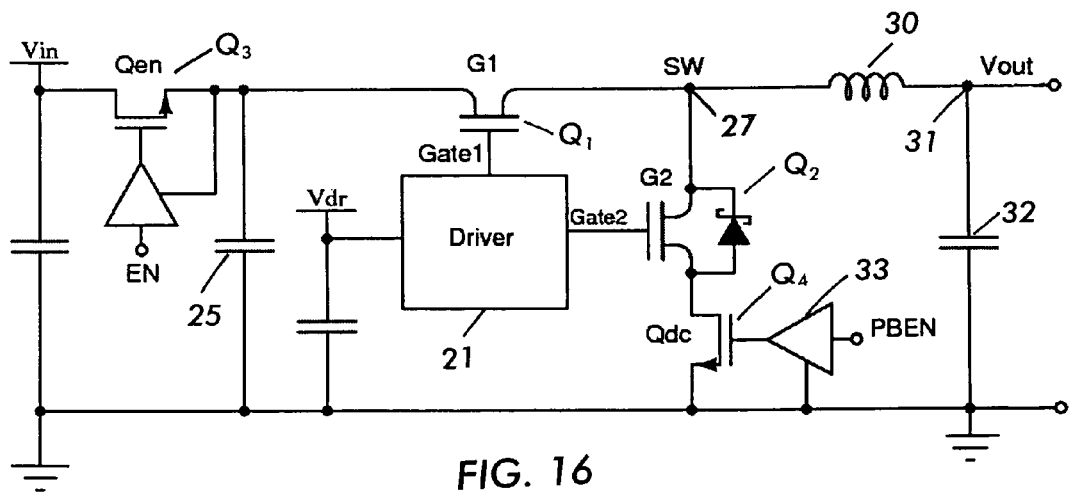
FIG. 16 illustrates another embodiment that includes an enable switch and a cut off switch for the III-nitride switches in both low side and high side.

FIG. 16 illustrates another embodiment of the present invention in which enable switch $Q_3$ and cutoff-switch $Q_4$ are implemented together, and control switch $Q_1$ and synchronous switch $Q_2$ are both depletion mode III-nitride switches. FIG. 16 is just one example of how enable and cutoff switches should be used with III-nitride switches on both high side and low side. The combinations of the embodiments of FIGS. 4-6 for high side III-nitride switches and FIGS. 8-14 for low side III-nitride switches can also be applied as in FIG. 16 to obtain further embodiments.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A DC-DC converter comprising:
a driver circuit operable to drive first and second power switches connected at a switched node;
said second power switch comprising a depletion mode switch; and
a third switch operable to block conduction of current by said second power switch until a negative bias voltage is established to disable said second power switch.

2. The converter of claim 1, wherein said third switch is an enhancement mode switch.

3. The converter of claim 1, wherein said second power switch is a control switch in a buck converter.

4. The converter of claim 3, wherein said third switch is series connected with said second power switch and operates to enable conduction of current through said second power switch.

5. The converter of claim 1, wherein said second power switch is a synchronous switch in a buck converter.

6. The converter of claim 5, wherein said third switch is series connected with said second power switch and operates to enable conduction of current through said second power switch.

7. The converter of claim 1, wherein said second power switch is connected between said third switch and said switched node.

8. The converter of claim 1, wherein said third switch is connected between said second power switch and said switched node.

9. The converter of claim 1, comprising an output circuit coupled between said switched node and ground, wherein said third switch is part of said output circuit and is operated to cut off the circulation of current to said second power switch.

10. The converter of claim 9, wherein said output circuit includes an inductor coupled between said switched node and an output node, and an output capacitor coupled between said output node and ground, wherein said third switch is series connected between said inductor and said switched node.

11. The converter of claim 9, wherein said output circuit includes an inductor coupled between said switched node and an output node, and an output capacitor coupled between said output node and ground, wherein said third switch is series connected between said inductor and said output node.

12. The converter of claim 9, wherein said output circuit includes an inductor coupled between said switched node and an output node, and an output capacitor coupled between said output node and ground, wherein said third switch is series connected between said output capacitor and said output node.

13. The converter of claim 9, wherein said output circuit includes an inductor coupled between said switched node and an output node, and an output capacitor coupled between said output node and ground, wherein said third switch is series connected between said output capacitor and ground.

14. The converter of claim 9, wherein said output circuit includes an inductor coupled between said switched node and an output node, and an output capacitor coupled between said output node and ground, wherein said third switch is series connected between the ground connection of said III-nitride depletion mode device and the ground connection of said output capacitor.

15. The converter of claim 1, wherein said second power switch is a synchronous switch, and said enhancement mode switch is connected between said second power switch and said switched node.

16. The converter of claim 1, wherein said second power switch is a synchronous switch, and said third switch is connected between said second power switch and ground.

17. The converter of claim 1, wherein said driver circuit is operable to drive said second power switch using said negative bias voltage.

18. The converter of claim 1, wherein said second power switch comprises a III-nitride power switch.

19. The converter of claim 1, wherein said second power switch comprises a heterojunction power semiconductor device.

20. A DC-DC converter comprising:

a driver circuit operable to drive first and second power switches connected at a switched node;

said second power switch comprising a III-nitride depletion mode control switch; and an enhancement mode enable switch series connected with said second power switch, said enable switch operated to block conduction of current by said second power switch until a negative bias voltage is established to disable said second power switch.

* * * * *